US011379502B2

(12) United States Patent
Gupta et al.

(10) Patent No.: US 11,379,502 B2
(45) Date of Patent: *Jul. 5, 2022

(54) PLACE VISIBILITY SCORING SYSTEM

(71) Applicant: Uber Technologies, Inc., San Francisco, CA (US)

(72) Inventors: Kapil Gupta, Sunnyvale, CA (US); Jeremy Hintz, Mountain View, CA (US); Susmit Biswas, San Mateo, CA (US); Houtan Shirani-Mehr, Santa Clara, CA (US); Moustafa Elshikh, San Jose, CA (US); Sai Bhuvan Teja Balla, Sunnyvale, CA (US); Roberto Fonti, San Francisco, CA (US); Juthika Kiran Dabholkar, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/185,978

(22) Filed: Nov. 9, 2018

(65) Prior Publication Data
US 2020/0151265 A1 May 14, 2020

(51) Int. Cl.
G06F 16/00 (2019.01)
G06F 16/29 (2019.01)
G06N 20/00 (2019.01)

(52) U.S. Cl.
CPC ............ G06F 16/29 (2019.01); G06N 20/00 (2019.01)

(58) Field of Classification Search
CPC .......... G06F 16/29; G06F 16/50; G06F 3/048; G06F 40/30; G06F 16/587;
(Continued)

(56) References Cited

U.S. PATENT DOCUMENTS 8,688,377 B1 * 4/2014 Urbach ................. G01C 21/30
701/522
9,551,586 B2 1/2017 Guo
(Continued)

FOREIGN PATENT DOCUMENTS

KR 101315576 10/2013

OTHER PUBLICATIONS

"International Application Serial No. PCT IB2018 054118 International Search Report dated Sep. 10, 2018", 3 pgs.
(Continued)

Primary Examiner — Shew Fen Lin
(74) Attorney, Agent, or Firm — Schwegman Lundberg & Woessner, P.A.

(57) ABSTRACT

Systems and methods are provided for receiving geographic coordinates for a location, determining a road segment associated with the location based on the geographic coordinates for the location, and determining a plurality of places associated with the road segment associated with the location. The systems and methods further provide for extracting visual data for each of the plurality of places, generating a plurality of feature values based on the visual data for each of the plurality of places, and analyzing the plurality of feature values to generate a visibility score for each of the plurality of places.

17 Claims, 10 Drawing Sheets

(58) Field of Classification Search
CPC .... G06K 2209/01; G06K 9/46; G06K 9/6215; G06K 9/6217; G06N 20/00; G06N 20/20; G06N 5/003; G06Q 10/02; G06Q 50/30
See application file for complete search history.

(56) References Cited

U.S. PATENT DOCUMENTS

| | | | |
|---|---|---|---|
| 10,024,683 | B2 | 7/2018 | Moore et al. |
| 10,708,708 | B2 | 7/2020 | Fonti et al. |
| 2006/0058041 | A1 | 3/2006 | Cheng |
| 2010/0010737 | A1 | 1/2010 | Pyo |
| 2010/0125406 | A1* | 5/2010 | Prehofer ............ G01C 21/3641 701/533 |
| 2010/0268449 | A1 | 10/2010 | Feng |
| 2010/0318291 | A1* | 12/2010 | Gluck ................. G01C 21/367 701/532 |
| 2011/0054777 | A1* | 3/2011 | Rossio ............... G01C 21/3644 701/533 |
| 2012/0123678 | A1 | 5/2012 | Poppen et al. |
| 2012/0197714 | A1 | 8/2012 | Beyeler et al. |
| 2013/0196692 | A1* | 8/2013 | Huang ................... H04W 4/18 455/457 |
| 2013/0238234 | A1* | 9/2013 | Chao ........................ G06K 9/46 701/409 |
| 2014/0039792 | A1* | 2/2014 | Seetharam ......... G01C 21/3679 701/538 |
| 2014/0107917 | A1 | 4/2014 | Kazawa et al. |
| 2014/0236482 | A1 | 8/2014 | Dorum et al. |
| 2015/0012596 | A1 | 1/2015 | Redstone et al. |
| 2015/0117796 | A1* | 4/2015 | Hile ...................... G06F 16/583 382/305 |
| 2015/0285652 | A1 | 10/2015 | Peri et al. |
| 2016/0069699 | A1* | 3/2016 | Chen ................... G01C 21/3682 701/426 |
| 2016/0102991 | A1* | 4/2016 | Ettinger ............. G01C 21/3644 701/428 |
| 2016/0216117 | A9 | 7/2016 | Bandyopadhyay et al. |
| 2016/0349059 | A1* | 12/2016 | McGuire ............ G01C 21/3644 |
| 2016/0363458 | A1* | 12/2016 | Guo ....................... G01C 21/36 |
| 2017/0023374 | A1 | 1/2017 | Poppen et al. |
| 2017/0089715 | A1 | 3/2017 | Guo |
| 2018/0014161 | A1* | 1/2018 | Warren ................. H04W 4/023 |
| 2018/0066948 | A1* | 3/2018 | Bailiang ............ G01C 21/3673 |
| 2018/0067953 | A1* | 3/2018 | Stallman ............ G01C 21/3682 |
| 2018/0239524 | A1* | 8/2018 | Snibbe ................. G11B 27/031 |
| 2018/0301031 | A1* | 10/2018 | Naamani .............. G06K 9/4604 |
| 2019/0017842 | A1 | 1/2019 | Moore et al. |
| 2019/0186933 | A1* | 6/2019 | Greenberg ......... G01C 21/3655 |
| 2020/0120441 | A1 | 4/2020 | Fonti et al. |

OTHER PUBLICATIONS

"International Application Serial No. PCT IB2018 054118 International Written Opinion dated Sep. 10, 2018", 7 pgs.
"U.S. Appl. No. 16/161,838, Examiner Interview Summary dated Feb. 12, 2020", 3 pgs.
"U.S. Appl. No. 16/161,838, Final Office Action dated Dec. 18, 2019", 23 pgs.
"U.S. Appl. No. 16/161,838, Non Final Office Action dated Jun. 21, 2019", 18 pgs.
"U.S. Appl. No. 16/161,838, Notice of Allowance dated Mar. 11, 2020", 15 pgs.
"U.S. Appl. No. 16/161,838, Response filed Feb. 12, 2020 to Final Office Action dated Dec. 18, 2019", 12 pgs.
"U.S. Appl. No. 16/161,838, Response filed Sep. 20, 2019 to Non-Final Office Action dated Jun. 21, 2019", 9 pgs.

* cited by examiner

PLACE VISIBILITY SCORING SYSTEM

BACKGROUND

A physical address is typically used for providing directions or for navigation. In many situations, however, the physical address alone may not be very useful. For example, a user may be using a ride service application and need to know where to meet the driver or other passengers for the ride. A user may not be familiar with the area or may not know a specific street or address, and thus simply providing an address alone may not be very helpful.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
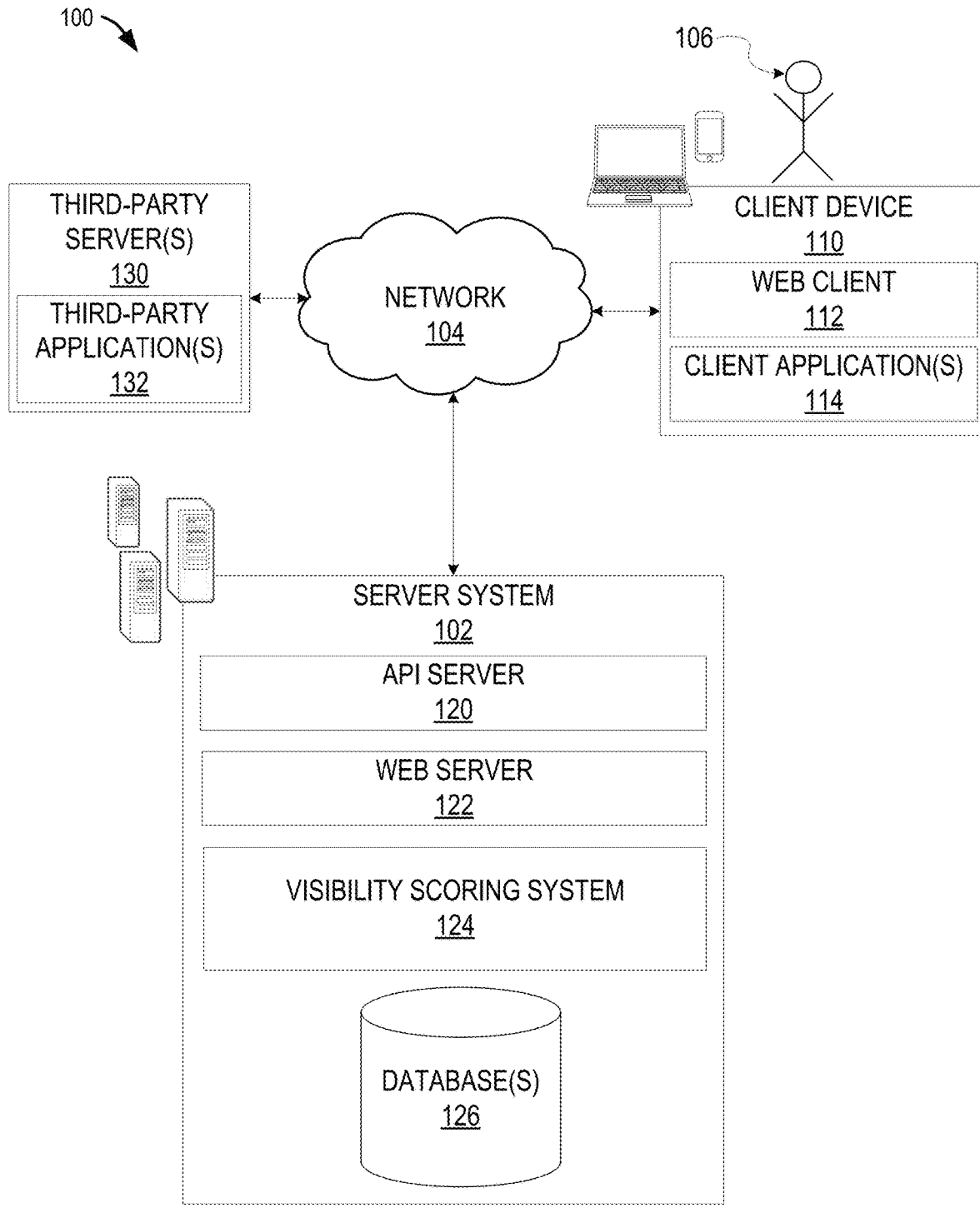
FIG. 1 is a block diagram illustrating a networked system configured to generate a visibility score for one or more places, according to some example embodiments.

Systems and methods described herein relate to a place visibility scoring system. For example, example embodiments use visual data, such as images of one or more places (e.g., buildings, restaurants, parks, stores, shopping centers, etc.), to determine how visible a sign or logo for the place is when driving, walking, biking, or arriving near the place. The visibility of the sign or logo for a place (e.g., from the outside of the place) may be used to select a best place, from multiple places in a given location, to use instead of or in addition to a physical address when providing directions or for navigation. As explained above, a physical address (e.g., 1234 Main Street, Anywhere, Calif.) may not be very useful when finding a location to meet or following driving directions in an area unfamiliar to a user, or where physical addresses may not be visible or easy to see from the road or sidewalk.

There are many technical challenges to determining visibility information for a place. For example, there are a number of factors that may determine how visible text or a logo is on or near a place (e.g., on a sign or side of a building). Some example factors include a size of a sign, the height of the sign, the distance of the sign from the road, from what side of the road the sign is visible, from which direction the sign is visible, readability of the sign, time of day the sign is visible, and so forth. Moreover, there may be a limited number of images available for the place, some images may only be taken from a certain direction, some may only be taken during a certain time of day, and so forth. One technical problem is that the complexity of so many factors becomes far beyond human capability to calculate. For example, a navigation or ride-sharing system may receive thousands of requests for trips or data every minute. It is not possible to manually determine how many places are nearby (e.g., nearby a trip location such as a pickup or drop-off location), which places are most visible, and the dependency of the variety of factors for visibility on each of the other factors, or which direction may have better visibility and during what time of day, and so forth. Accordingly, example embodiments use machine learning technology to analyze a plurality of images associated with each place near a given geolocation to determine the visibility of the place or of a sign, text, or logo associated with the place.

For example, in some example embodiments a server system receives geographic coordinates for a location, determines a road segment associated with the location based on the geographic coordinates for the location, and determines a plurality of places within (or associated with) the road segment associated with the location. The server system extracts visual data for each of the plurality of places and generates a plurality of feature values based on the visual data for each of the plurality of places. The server system analyzes, using a trained machine learning model, the plurality of feature values to generate a visibility score for each of the plurality of places. The visibility score may be used to select a best place from the plurality of places based on the visibility scores for each of the plurality of places.

FIG. 1 is a block diagram illustrating a networked system 100, according to some example embodiments, configured to generate a visibility score for one or more places. The system 100 includes one or more client devices such as a client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to request map information, provide map information, request navigation information, receive and display results of map and/or navigation information, request data about a place or entity in a particular location, receive and display data about a place or entity in a particular location, and so forth.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, a server system 102) via a network 104. In this instance, the other entities in the system 100, in response to receiving the input from the user 106, communicate information to the client device 110 via the network 104 to be presented to the user 106. In this way, the user 106 interacts with the various entities in the system 100 using the client device 110.

The system 100 further includes the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WIFI network, a WiMax network, another type of network, or a combination of two or more such networks.

The client device 110 accesses the various data and applications provided by other entities in the system 100 via a web client 112 (e.g., a browser, such as the Internet Explorer® browser developed by Microsoft® Corporation of Redmond, Wash. State) or one or more client applications 114. The client device 110 may include the one or more client applications 114 (also referred to as "apps") such as, but not limited to, a web browser, a messaging application, an electronic mail (email) application, an e-commerce site application, a mapping or location application, a ride-sharing application, and the like.

In some embodiments, the one or more client applications 114 may be included in the client device 110, and configured to locally provide a user interface and at least some of the functionalities of the one or more client applications 114, with the client application 114 configured to communicate with other entities in the system 100 (e.g., the third-party servers 130, the server system 102), on an as-needed basis, for data and/or processing capabilities not locally available (e.g., to access location information, to authenticate the user 106, to verify a method of payment, etc.). Conversely, the one or more applications 114 may not be included in the client device 110, and the client device 110 may use its web browser to access the one or more applications hosted on other entities in the system 100 (e.g., the third-party servers 130, the server system 102).

The server system 102 provides server-side functionality via the network 104 (e.g., the Internet or a wide area network (WAN)) to one or more third-party servers 130 and/or one or more client devices 110. The server system 102 may include an application programming interface (API) server 120, a web server 122, and a visibility scoring system 124 that are communicatively coupled with one or more databases 126.

The one or more databases 126 are storage devices that store data related to one or more of source code, machine learning model training data, image data (including extracted text from images), place or other mapping data (e.g., addresses, points of interest), and so forth. The one or more databases 126 may further store information related to the third-party servers 130, third-party applications 132, the client device 110, the client applications 114, the user 106, and so forth. The one or more databases 126 may be cloud-based storage.

The server system 102 is a cloud computing environment, according to some example embodiments. The server system 102, and any servers associated with the server system 102, are associated with a cloud-based application, in one example embodiment.

The visibility scoring system 124 provides back-end support for the third-party applications 132 and the client applications 114, which may include cloud-based applications. The visibility scoring system 124 receives geographic coordinates for a location, determines a road segment associated with the location, determines a plurality of places within (or associated with) the road segment, extracts visual data for each of the plurality of places, generates feature values based on the visual data, analyzes the feature values to generate a visibility score, and so forth as described in further detail below. The visibility scoring system 124 comprises one or more servers or other computing devices or systems.

The system 100 further includes one or more third-party servers 130. The one or more third-party servers 130 comprise one or more third-party applications 132. The one or more third-party applications 132, executing on the third-party server(s) 130, interact with the server system 102 via a programmatic interface provided by the API server 120. For example, the one or more third-party applications 132 may request and utilize information from the server system 102 via the API server 120 to support one or more features or functions on a website hosted by a third party or an application hosted by the third party. The third-party website or third-party application 132, for example, provides mapping, location, ride-sharing, or other functionality that is supported by relevant functionality and data in the server system 102.

Figure 2:
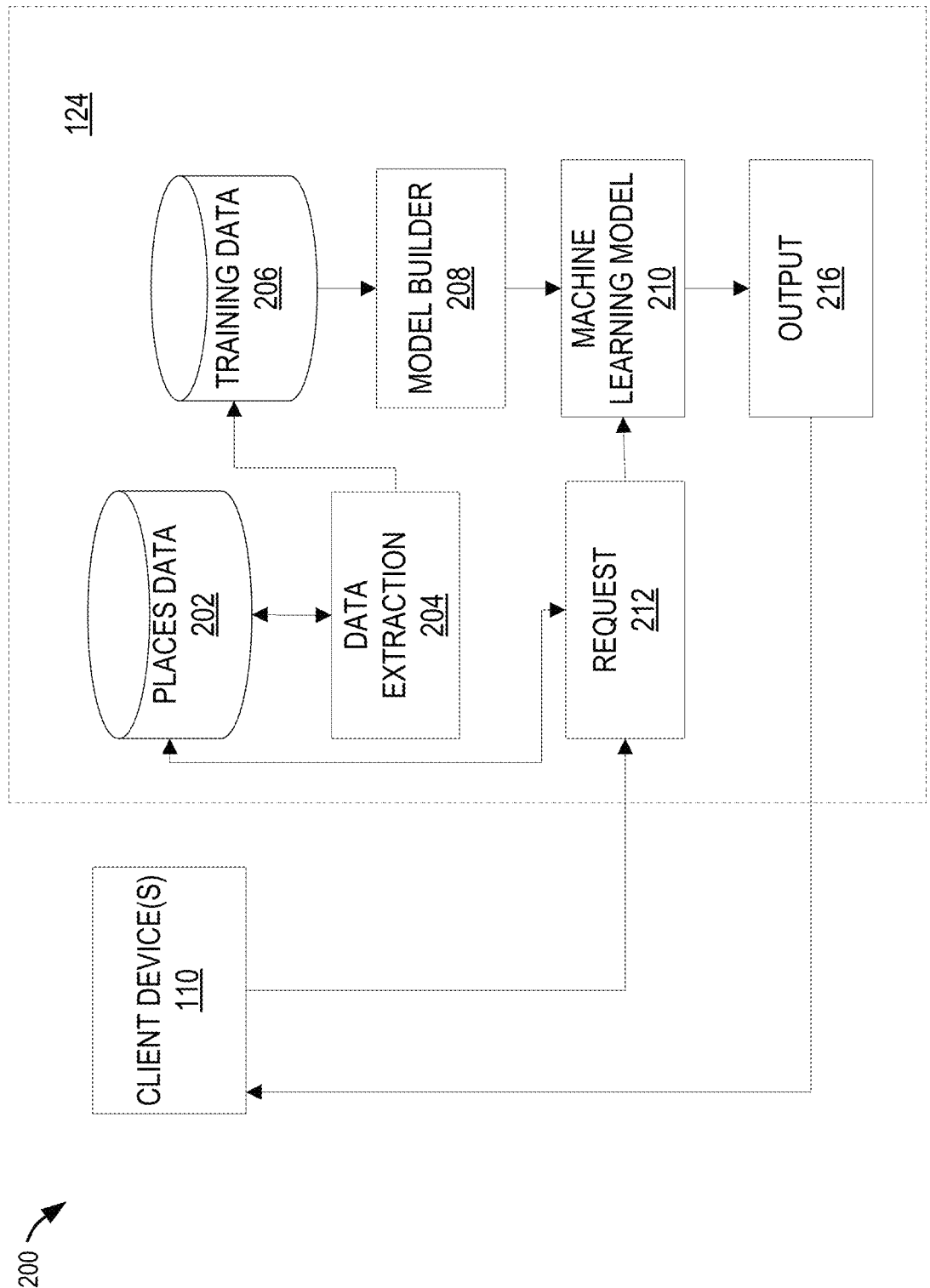
FIG. 2 is a block diagram illustrating a visibility scoring system comprising a machine learning model trained to generate a visibility score, according to some example embodiments.

FIG. 2 is a block diagram 200 illustrating a visibility scoring system 124 comprising a machine learning model trained to generate a visibility score for a place associated with a given geolocation, according to some example embodiments. A data extraction module 204 extracts data from places data 202 stored in one or more databases (e.g., the one or more databases 126) and stores the extracted data as training data 206 (e.g., in the one or more databases 126). For example, the data extraction module 204 may extract positive examples and negative examples from the places data 202 to use as training data 206. The places data 202 may comprise indicators of a plurality of places and information associated with each of the plurality of places. For example, the places data 202 may comprise, for each place, a place name, a place address, geocoordinates for the place (e.g., latitude and longitude), one or more place categories (e.g., restaurant, bar, coffee shop, park, church), visual data (e.g., images and/or metadata for images) associated with the place, and so forth. One or more features may also be generated for training data.

In one example, to build a training set, operators are provided a set of images (for which all feature values can be derived) and rate how visible they find places depicted in each respective image to be (e.g., from 0-10, wherein 0 indicates "not at all visible" and 10 indicates "virtually impossible to miss"). Since each operator may have his or her own subjective conception of what constitutes these levels of visibility, and everything in between, the scores are normalized among groups of operators who view the same set of images in order to ensure that operators who incline one way or the other are appropriately regularized. The output for the training data may include:

Image_X Visibility_Score where Image_X is an identifier for a given image and Visibility Score is the aggregation of the normalized visibility scores given by operators. Then, in training the model, the system minimizes the squared error between the predicted visibility score and the visibility score given by operators.

The training data 206 is used by a model builder 208 to train a machine learning model 210. Some example machine learning models include decision tree-based models, such as Gradient Boosted Trees or Random Forest models. A client device 110 requests data via a request module 212, which retrieves candidate places from the places data 202 and extracts features (e.g., visual data) for the candidate places, as described below. The request module 212 generates a plurality of feature values based on the visual data for each of the candidate places and inputs the plurality of feature values into the machine learning model 210. The machine learning model 210 takes the input feature values and outputs a visibility score for each candidate place into an output module 216. For example, the machine learning model 210 operates on the input parameters (e.g., feature values) to estimate how visible a place is. The output module 216 returns a best candidate place (or a list of candidate places and their respective scores, or several best candidate places, etc.) to the client device 110, as explained in further detail below.

Figure 3:
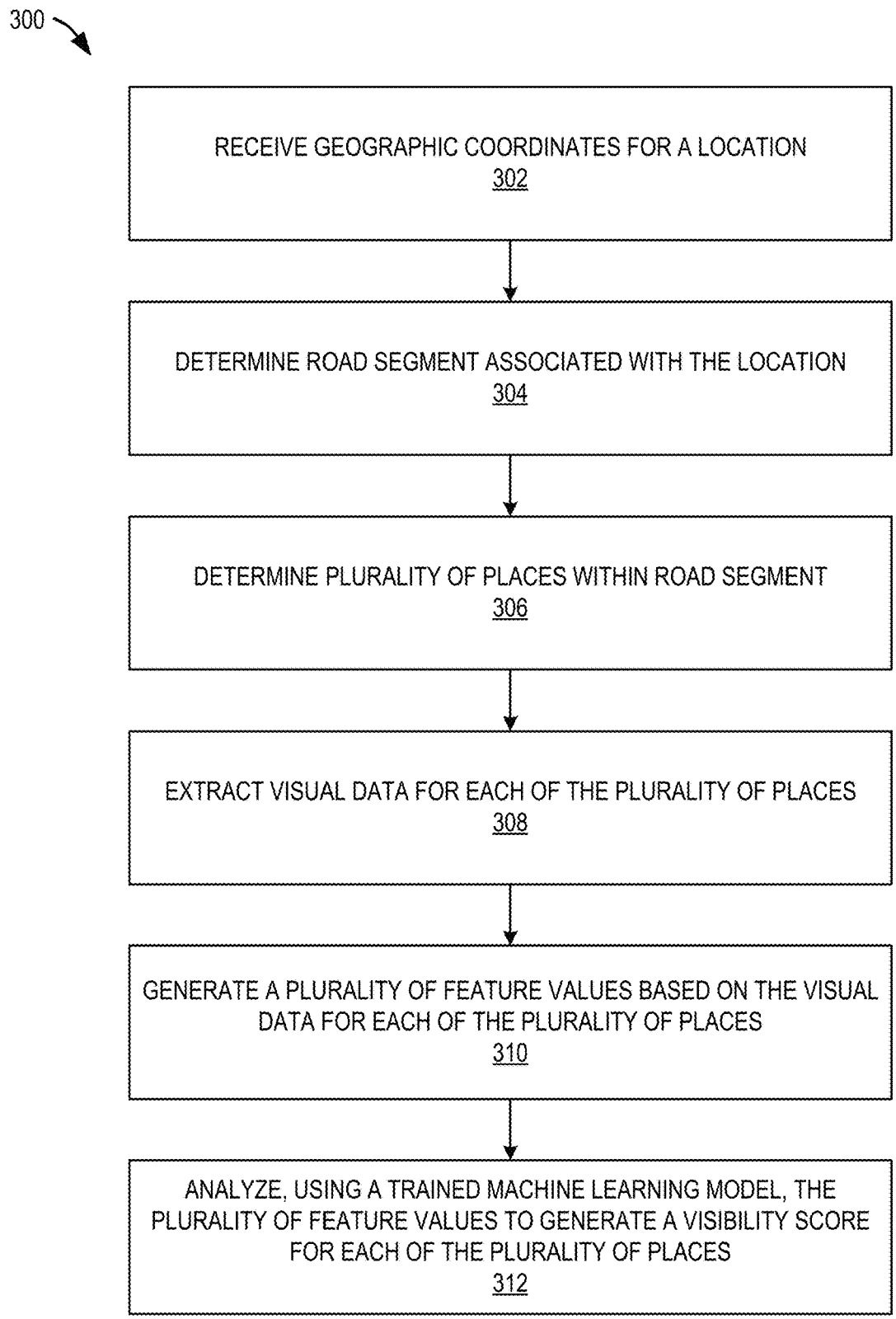
FIG. 3 is a flow chart illustrating aspects of a method for generating a visibility score, according to some example embodiments.

FIG. 3 is a flow chart illustrating aspects of a method 300 for generating a visibility score for each of a plurality of places associated with a given location, according to some example embodiments. For illustrative purposes, the method 300 is described with respect to the networked system 100 of FIG. 1. It is to be understood that the method 300 may be practiced with other system configurations in other embodiments.

In operation 302, a server system (e.g., the server system 102 or the visibility scoring system 124) receives geographic coordinates for a location. In one example, the geographic coordinates comprise a latitude and longitude (e.g., 37.773972, −122.431297). In other examples, the server system receives other location information in addition to or instead of geographic coordinates, such as a physical address (e.g., 123 Main Street), a cross street (e.g., Main Street and Second Ave), and the like.

In one example, the server system receives the geographic coordinates from a client device 110. For example, a user may be using a ride services application on his mobile device to request a ride to another location. When the user opens the ride services application or requests a ride, the client device 110 sends the geographic coordinates associated with the location of the client device 110 to the server system. The geographic coordinates may be determined using GPS or another technology of the client device 110. The geographic coordinates may be sent by the client device 110 as part of a request for a location or place for meeting up with other riders or the driver for the ride, or may simply be sent periodically while the application is running.

In some example embodiments, additional information is also sent by the client device 110 to the server system, such as a direction of travel (e.g., the direction the client device 110 is moving, such as north, east, south, west, or some combination of directions), a time of day, and so forth. In other example embodiments, some or all of this additional information is determined by the server system.

In operation 304, the server system determines a road segment associated with the location based on the geographic coordinates for the location. For example, each road in a map may be divided into one or more segments (e.g., depending on the length of the road, density of the area where the road is located, and so forth). Each of these road segments may be a predetermined length (e.g., 50 meters) and have a unique identifier. In some embodiments, the road segment may correspond to a section of a road between two roadway intersections. A predetermined range of geographic coordinates may be associated with each road segment. In this example, the server system determines which road segment comprises the received geographic coordinates for the location (e.g., that the geographic coordinates correspond to the predetermined range of geographic coordinates associated with the road segment, or that the geographic coordinates are within a predetermined distance of the predetermined range of geographic coordinates associated with the road segment).

Figure 4:
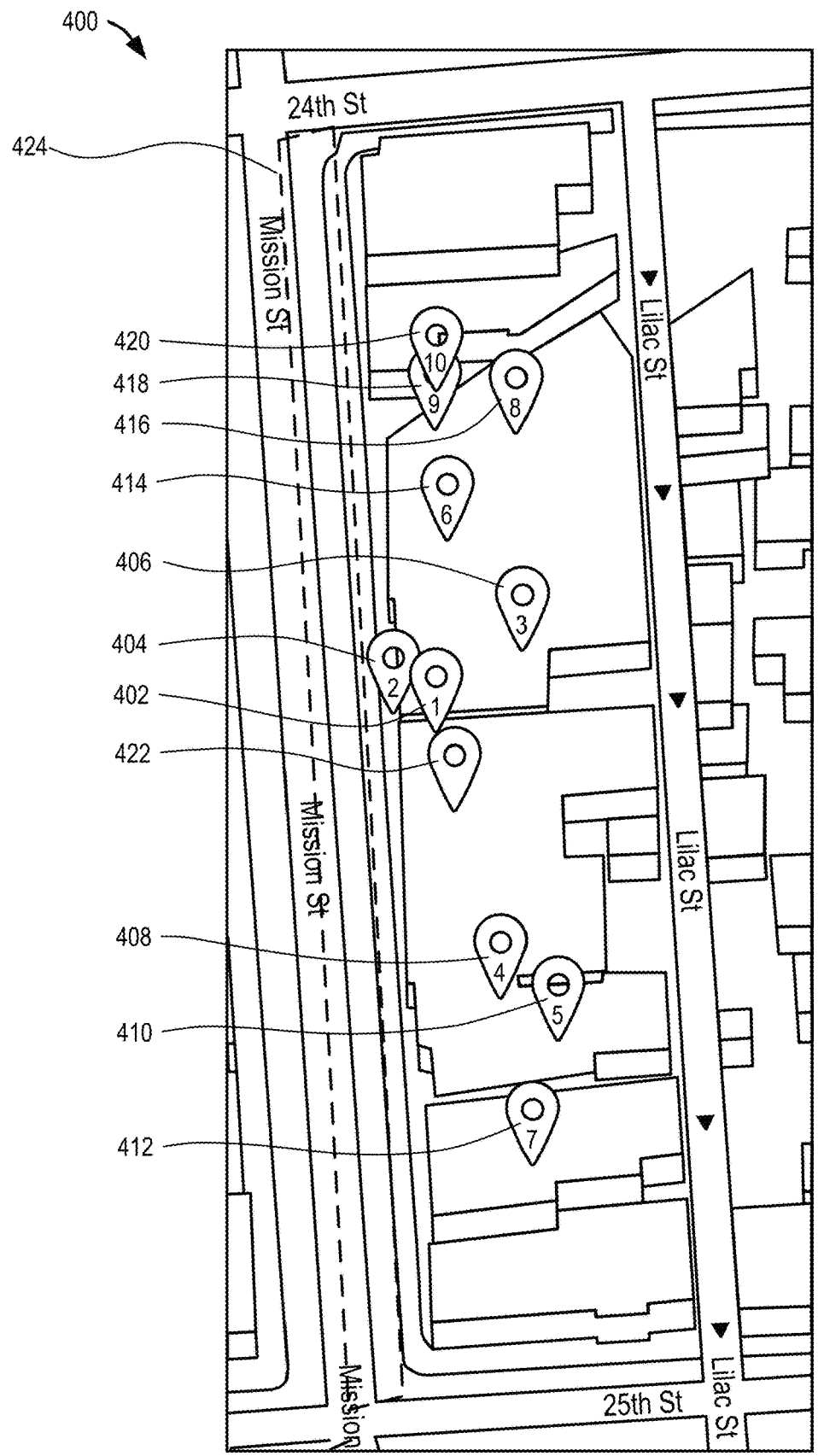
FIG. 4 illustrates a visual representation of places within an example road segment, according to some example embodiments.

In operation 306, the server system determines a plurality of places within (or associated with) that road segment. For example, the server system accesses a data store (e.g., the one or more databases 126 or places data 202) to retrieve places that have geographic coordinates (or other location information) within or near the range of geographic coordinates for the road segment (e.g., places with geographic coordinates along the road segment). In one example, retrieval of places are based on spatial closeness based on an underlying database that is optimized for storing and querying data that represents objects defined in a geometric space (e.g., geographic data). FIG. 4 illustrates a visual representation 400 of a plurality of places 402-422 that are within a road segment 424 on Mission Street between 24$^{th}$ Street and 25$^{th}$ Street (e.g., the plurality of places 402-422 may have an address on or associated with Mission Street between 24$^{th}$ Street and 25$^{th}$ Street). A road segment may comprise a particular direction or side of a road. For example, Mission Street is a two-way road, and the example road segment 424 comprises the east side of Mission Street heading north.

In one example, the server system determines a direction of movement or travel based on the received geographic coordinates and at least one set of previously received geographic coordinates for a prior location. For example, if it receives a first set of geographic coordinates and then a second set of geographic coordinates from a computing device, the server system can determine a direction of movement of the computing device based on the two sets of geographic coordinates by determining that the second set is farther north, south, east, west, or some combination of directions. In another example, the server system receives the direction of movement from the client device 110. In one example, the server system also uses the direction of movement to choose or verify a road segment (e.g., to determine which side of the road the computing device is moving along).

In operation 308, the server system extracts visual data for each of the plurality of places. For example, the server system accesses a data store (e.g., the one or more databases 126 or places data 202) to retrieve visual data for each of the plurality of places. Visual data may include images or video, and/or metadata with information describing the images or video. For example, visual data may include photographs or videos taken by a camera located in a car, a camera on the side of a building or on a street, a camera of a user walking or biking, and so forth, that are associated with a particular location or place.

In one example, the server system extracts visual data based on a time of day. For example, if the time of day for determining visibility scores is during the day versus at night, the server system only extracts visual data that was captured during the day. In one example, the server system determines the time of day for the visual data based on metadata or attributes associated with the visual data. For example, each image may have data with the date and/or time (if available) the image was captured.

Figure 5:
FIG. 5 illustrates two example photographs, according to some example embodiments.
Figure 5:

In operation 310, the server system generates a plurality of feature values based on the visual data for each of the plurality of places. Example feature values comprise at least one of a size of text or a logo in the visual data, a height of visible text in the visual data, a distance from the road of the visible data, road segments from which visible text in the visual data is visible, a directionality of visibility, a readability of visible text in the visual data, and so forth as explained in further detail below. For example, FIG. 5 illustrates two photographs 502 and 504. The degree of visibility of the sign in the photograph 502 and that of the sign in the photograph 504 are different. For instance, the gas station sign in the photograph 502 is more visible from a greater distance because the logo and text are higher up in the air, have a bigger size, are visible from multiple sides of the street, and so forth. Accordingly, the visibility of a sign, or a text or logo of a place, is dependent upon where a user (e.g., driver, pedestrian, biker) is located, the distance of the user from the place, the direction in which the user is traveling, and so forth, and thus, the degree of visibility may vary based on many factors (e.g., features).

In one example, the server system generates the feature values from the visual data upon receiving the geographic coordinates for a location or a request for a visibility score for one or more places near a location. In another example, one or more feature values are generated in advance and stored as metadata with the visual data, and the server system can use the metadata to generate the feature values. For example, the server system can either use the available metadata that includes the size of text or a logo for a place (e.g., in a sign or logo near or on a building of the place) to determine the feature value for the size of the text or logo, or can generate the size of the text or logo from the visual data in real time (or near real time). Other feature values can be similarly generated for other features.

Figure 6:
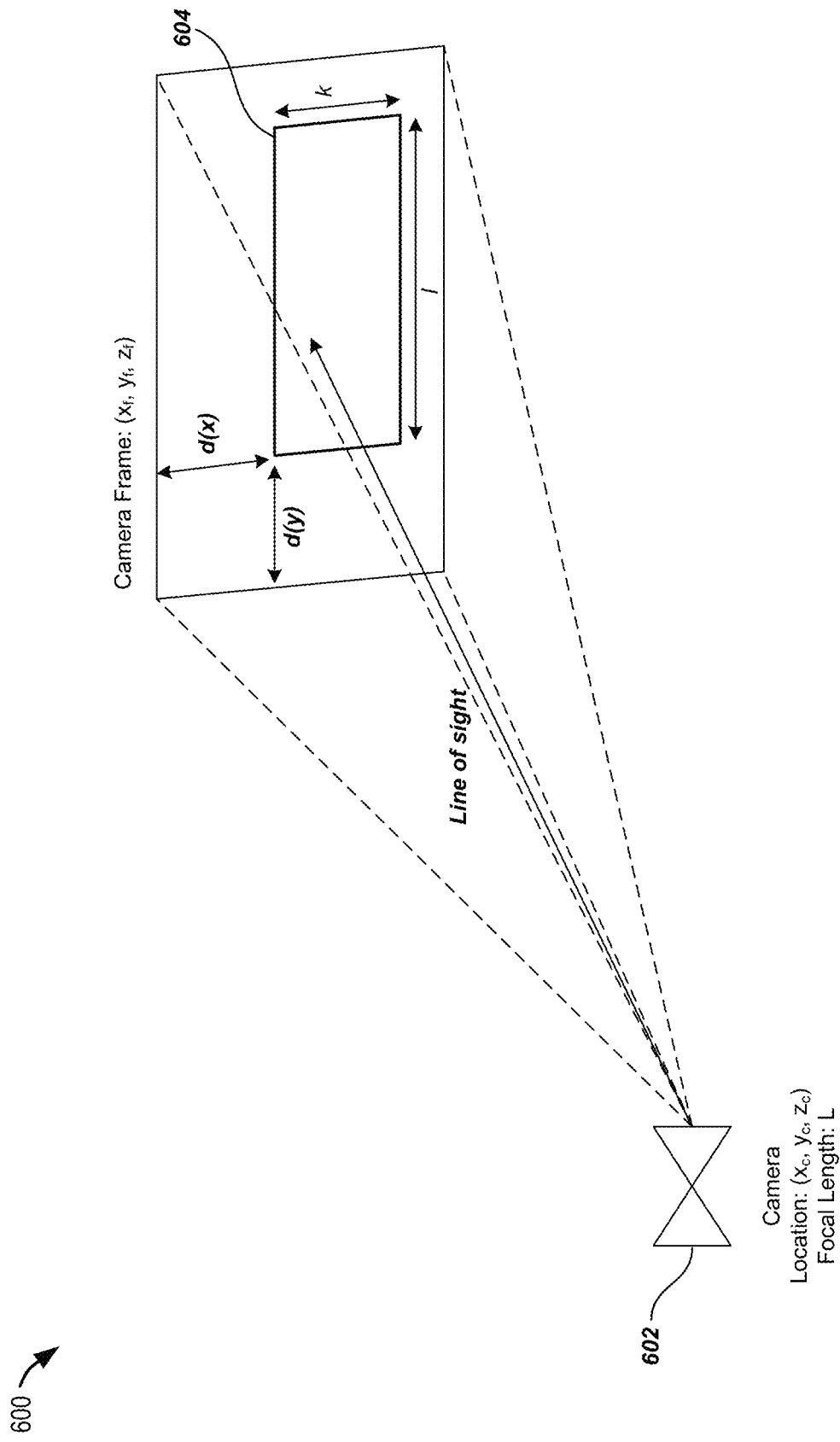
FIGS. 6-7 illustrate a camera taking a photograph that includes a sign, according to some example embodiments.
Figure 7:
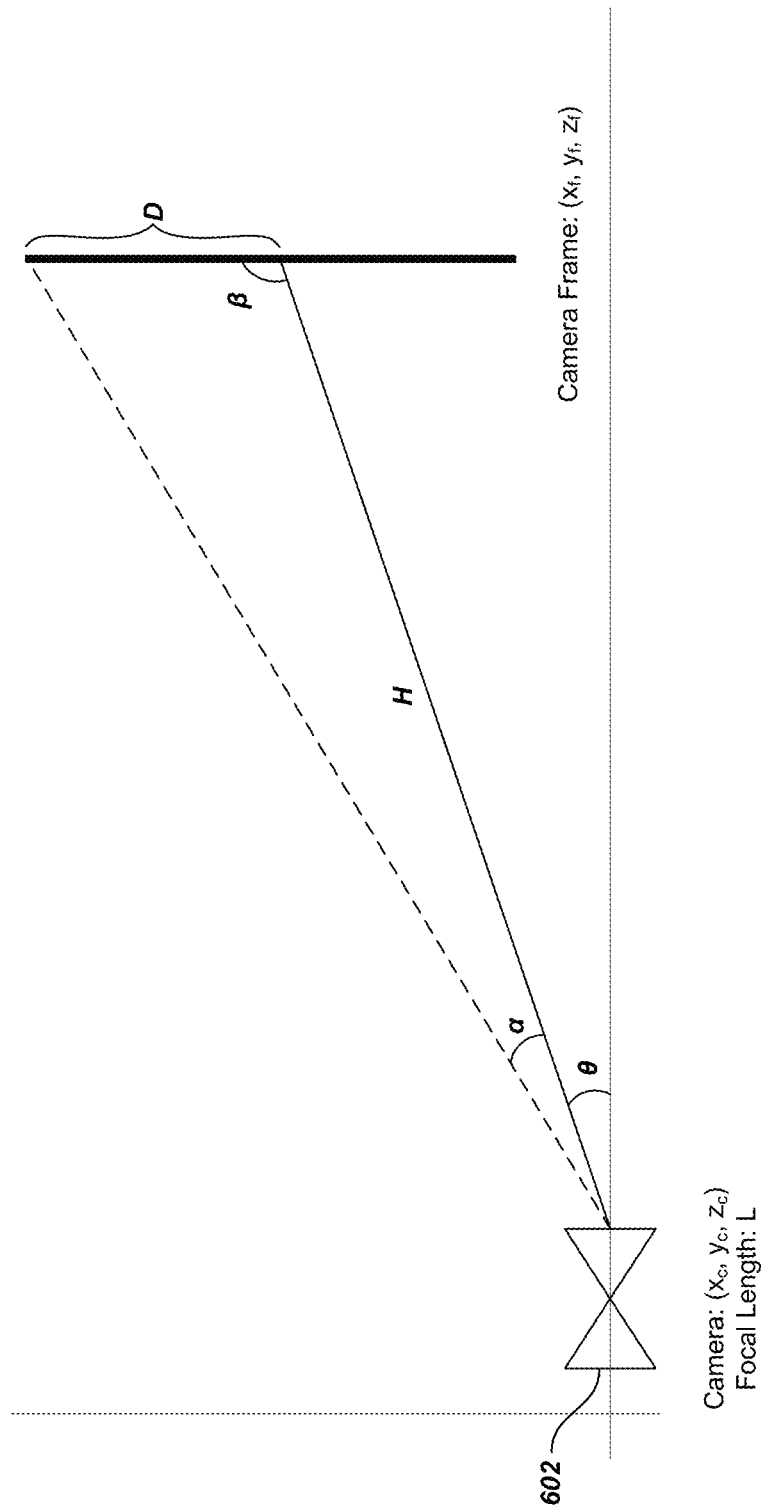

Some example embodiments use the size of text or a logo associated with a place (e.g., on a sign in front of the palace, on the outside of a building associated with the place) to determine visibility (e.g., a visibility score). The size of text or a logo can help determine the legibility of the place from a distance. Heuristics and models are used to predict the size of text or a logo from images collected from cameras (e.g., while collecting images for street level views) and at what angle the text or logo is visible. In one example, this is calculated by trigonometric means, given the following:

$(x_f, y_f, z_f)$ The triangulated location coordinate of the object/camera frame
$(x_c, y_c, z_c)$ The location coordinate of the car and camera
$(\bar{x}_n, \bar{y}_n, \bar{z}_n)$ The normal vector for the sign
P The polygon representing the shape of the sign, relative to the overall (normalized) camera frame, described as d(x, y), the displacement from the edge of the frame, and (l, h), the length and height, respectively, of the sign within the frame
h, L The sensor height and focal length of the camera at capture FIGS. 6 and 7 illustrate how the size of the sign (or just logo or text) is derived. FIGS. 6 and 7 illustrate a camera 602 taking a picture that includes a sign 604. FIG. 6 illustrates a perspective view and FIG. 7 illustrates a perpendicular view.

If the real-world dimensions of the camera frame are known, the dimensions of the sign 604 can be deduced because the parameters of l and h are given within a normalized view of the camera frame. In FIG. 7, the axes in the image are arbitrary; the same geometric principles apply for all pairs of dimensions. In the following description, x is used as the horizontal axis and z is used as the vertical axis for simplicity, but note that this is also true in the case of, for instance, the (x, y) plane that results when observing the setup from the top down. In order to calculate the dimensions of the camera frame, D in FIG. 7 is calculated from the side view, which will yield the height as 2D, and then from the top-down view, which will yield the length as 2D. With the knowledge of the real dimensions of a camera frame, l and h can be calculated and hence the size of the sign or just the size of the text or logo 604

Thus, in order to calculate D, because $(x_f, y_f, z_f)$ and $(x_c, y_c, z_c)$ are known, $\theta$ can be derived as $\tan^{-1}(z_f-z_c/x_f-x_c)$. Furthermore, $\beta$ is 90+θH is the "line of sight" vector from the camera to the frame, and is thus the hypotenuse of the right triangle formed by isolating the x and y dimensions, whose length can be derived by the Pythagorean Theorem. Lastly, α id equivalent to one half of the angular field of view (AFOV) for the camera 602, which is derived as $2 \cdot \tan^{-1}(h/2L)$. Now that we have one side and two angles for the triangle, the Law of Sines is used to deduce the value of D.

Other means may be used to calculate the size of the text or logo in an image; the above is just one example. Also, the server system can analyze the visual data to generate one or more feature values for the visual data (e.g., if there is more than one image, video, metadata, etc.) and then coalesce (e.g., combine, average, etc.) the values to have a final feature value indicating the size of the text or logo. This feature value can then be used to generate a visibility score, as described below. Moreover, if there is more than one instance of a text or logo in the visual data (e.g., more than one image of a sign or wording on the building), the server system may determine which instance is relevant (e.g., based on a direction of movement, road segment, time of day the image was captured, etc.). Thus, the server system may only consider images or metadata for the relevant images for a given location.

Another feature that is used by some example embodiments to determine visibility is the height (e.g., height from the ground) of the visible text or logo. This information will help in determining the legibility of the place from a distance. Based on the height of the visible text or logo, the server system can determine the radius from which it can be viewed. The height can be determined from the camera angle at which the image was captured, the position in the image of the visible logo or text, the distance of the road from the building (e.g., using basemap data), and so forth.

Some example embodiments also use the distance from the road as a feature to determine visibility. For example, based on capture points (e.g., the location of the resulting camera frame) and basemap data (e.g., the location of the road and building footprints), the server system can determine the distance of the text or logo from the road or sidewalk.

Some example embodiments use road segments from which text or a logo is visible as a feature to determine visibility. For example, the depicted locations and the intersecting rays from cameras are used to estimate in which road segments the cameras were located, and which images were able to capture text or logo information. For instance, if a place can be viewed from multiple road segments, the degree of visibility is likely to be high. Moreover, the road segments from which the text or logo is visible can be used to determine which of the visual data for a place (e.g., which images or metadata) is relevant to the given location.

Some example embodiments use directionality of visibility of text or a logo of a place as a feature to determine visibility. The directionality feature includes the direction in which the camera was traveling (e.g., on a one-way or two-way road) when the image was captured. For example, for a car-mounted camera, directionality may indicate which way the car was driving when the image was captured. For instance, a particular sign for a place may be more visible from one direction than from another direction or may only be visible from one direction and not another direction.

Some example embodiments use readability of the text or logo of a place as a feature to determine visibility. In one example, the readability of the text or logo is based on a font type. For instance, certain font types (e.g., Arial) may be determined to be more legible to human eyes than other font types (e.g., a cursive font type). In another example, readability of the text or logo may be based on whether only letters are used or if there are other images within the letters. For example, a place with the word "STAR" may have an actual star instead of the "A," which may make it less readable.

Some example embodiments use contrast of the text or logo with a background as a feature to determine visibility. For example, the text or logo may be more or less visible based on the color or texture of the background of the text or logo.

Some example embodiments use a time of day that the text or logo can be visible as a feature to determine visibility. For example, some text or a logo may have lighting to make it visible at night, while other text or another logo may not have lighting and thus not be visible, or be less visible, at night. In one example, the time of day refers to the time of day that the image was captured, and the server system can determine whether the text or logo is visible in the image (or how visible it is), and thus, whether it was visible at that time of day. The time of day can be the exact time and date that the image was captured, or a broader characterization of the time of day, such as day or night; morning, afternoon, evening, or night; and so forth. Some or all images may not be relevant to a given location based on the time of day the coordinates for the given location were received or based on the time of day requested. For example, if visibility information is requested for a time at night, only any images that were captured at night may be relevant to the request, in one example embodiment.

Some example embodiments use other visible identifiers in the space of the text or logo as a feature to determine visibility. For example, text or a logo may be more or less visible based on the density of other visible text or logos in the surrounding space. For instance, if the text or logo is on the only sign or building in the surrounding space, it may be more visible than if it is on only one sign of multiple signs in the surrounding space.

Some example embodiments use a type for the visibility information as a feature to determine visibility. For example, whether the visibility information is extracted from text on a billboard, a logo on a billboard, a storefront, a monument sign, a pylon sign, and so forth may be used as a feature to determine visibility.

Returning to FIG. 3, once the server system generates a plurality of feature values (all, a subset of, or additional features to the example features above) based on the visual data for each of the plurality of places, the server system analyzes, using a trained machine learning model, the plurality of feature values to generate a visibility score for each of the plurality of places, as shown in operation 312. For example, the server system inputs all of the feature values for each of the plurality of places into the trained machine learning model 210 shown in FIG. 2. As explained earlier, the machine learning model 210 is trained to generate a visibility score for a place. Thus, for each place, the machine learning model 210 analyzes the plurality of feature values for the place and generates a visibility score for the place. The output 216 of the machine learning model 210 is the visibility score for the place (or each place in the example of a plurality of places). In one example, the visibility score is a numerical score indicating the extent to which the place is visible. The numerical score may be a score between 0 and 1, where 0 indicates that the place is not visible and 1 indicates that the place is highly visible.

In one example, the visibility scores are used by the server system to select a best place from the plurality of places based on the visibility scores for each of the plurality of places. For example, a visibility score is between 0 and 1 (e.g., 0.4, 0.8, etc.) and the server system would choose the place that has the highest visibility score among all of the visibility scores as the best place to use for directions, navigation, a meeting place, or other applications.

In one example, the visibility scores are generated in response to receiving the geographic coordinates for a location (or by a request for such scores, a request for a best place, or the like), as described above in operations 308-312. In another example, the visibility scores are generated in advance (e.g., as also described in operations 308) and then stored as data associated with each place. In this example, the server computer can access place visibility data (e.g., stored in one or more databases 126, 202, or other datastore), the place visibility data indicating a place visibility score for each of the plurality of places. Thus, the server computer can access a place visibility score associated each of the plurality of places to determine and select a best place based on the visibility scores, as described above.

Figure 8:
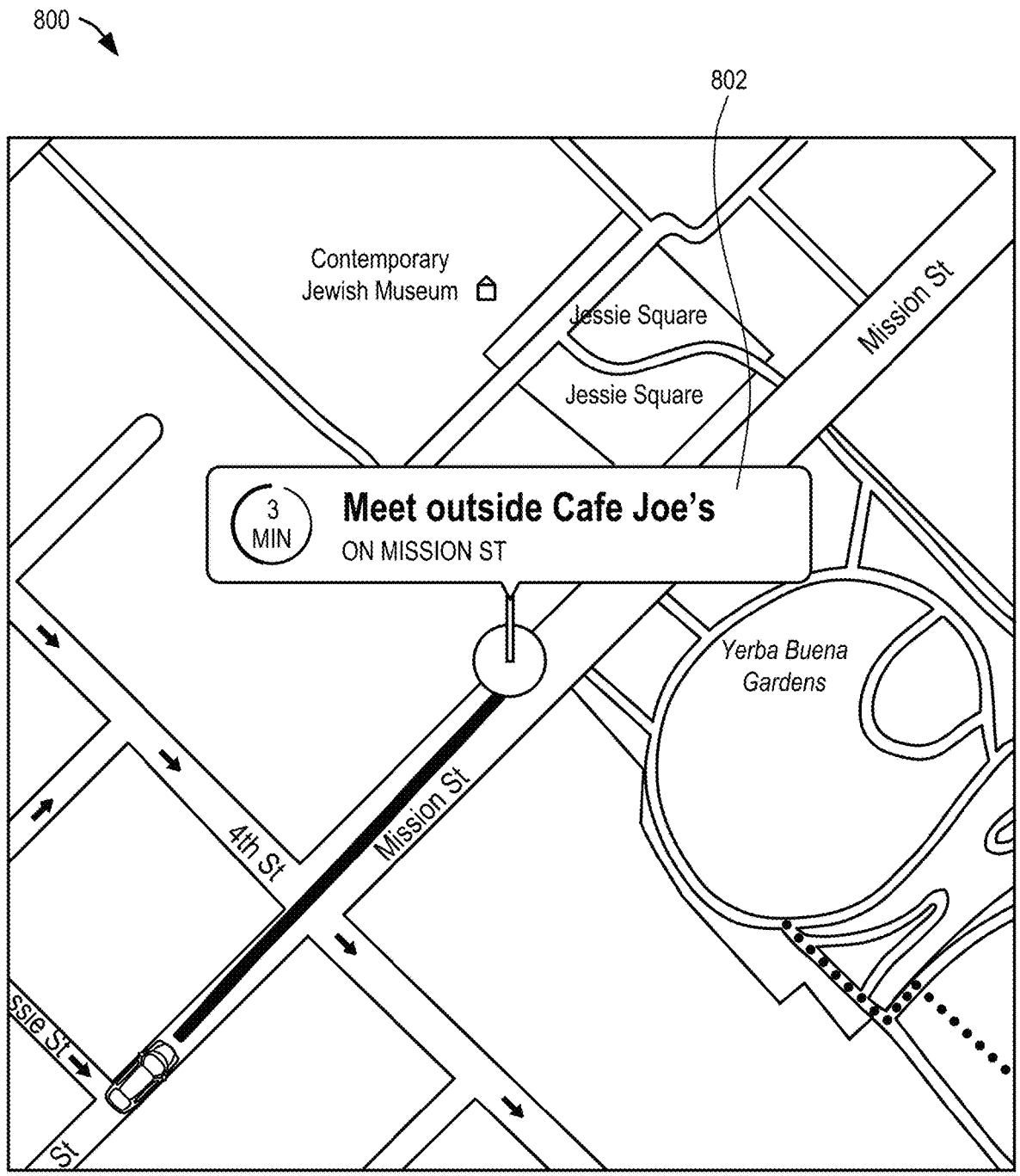
FIG. 8 illustrates an example user interface, according to some example embodiments.

In one example, the server system provides information (e.g., name, location, etc.) associated with the selected best place to a client device 110, and the client device 110 can use the information to display or provide the information to a user of the client device 110. FIG. 8 illustrates an example display 800 that may be provided on a client device 110 indicating a best place 802 (Café Joe's) to meet for a ride share (or other reason). In another example, the server system may provide information associated with a plurality of places and their associated visibility scores to a requesting client device 110, and the client device 110 can then use the information and visibility scores as needed.

There are many use cases for utilizing example embodiments described herein. As explained above, one use case is for navigation so that an application can provide more useful directions to a user, such as "In 60 meters, take a left just after the ACME Foods on your left." In order to give such directions in the real world, example embodiments can determine which places are visible from a car, from a bike, on foot, or from other means of transportation for the directions to provide the best results. As also explained above, another use case is to enhance a pickup experience or meeting place for ride-sharing or other services. For example, a service may wish to guide users to a given rendezvous point related to a place. It is valuable to recommend only places that the users would actually be able to see when orienting themselves. For example, "Meet your driver out front of ACME Foods."

Another example use case is in determining which points of interest (POIs) to display on a map. For example, example embodiments can enable determination of which POIs are most visible, and thus should be displayed on the map (e.g., by ranking a relevant set of POIs that could be displayed based on their visibility, and then displaying only a certain number x of the x highest ranked POIs). Example embodiments can also be used in POI-based reverse geocoding to provide a most visible place instead of or in addition to a physical address (e.g., such as by providing the result of "ACME Foods" instead of, or in addition to, "123 Main Street", when performing a reverse geocoding process on a set of input geographical co-ordinates).

The following examples describe various embodiments of methods, machine-readable media, and systems (e.g., machines, devices, or other apparatus) discussed herein.

EXAMPLE 1

A computer-implemented method comprising:
receiving, by a server system, geographic coordinates for a location;
determining, by the server system, a road segment associated with the location based on the geographic coordinates for the location;
determining, by the server system, a plurality of places associated with the road segment associated with the location;
extracting, by the server system, visual data for each of the plurality of places;
generating, by the server system, a plurality of feature values based on the visual data for each of the plurality of places, the feature values comprising at least one of a size of text or a logo in the visual data, a height of visible text in the visual data, a distance from a road of the visible text, road segments from which the visible text in the visual data is visible, a directionality of visibility, and a readability of the visible text in the visual data;
analyzing, by the server system, the plurality of feature values to generate a visibility score for each of the plurality of places; and
selecting, by the server system, a best place from the plurality of places based on the visibility scores for each of the plurality of places.

EXAMPLE 2

A method according to Example 1, wherein determining the road segment associated with the location is based on determining that the geographic coordinates for the location correspond to a predetermined range of geographic coordinates associated with the road segment.

EXAMPLE 3

A method according to any of the previous examples, wherein extracting the visual data comprises accessing one or more data stores to retrieve one or more images associated with each of the plurality of places.

EXAMPLE 4

A method according to any of the previous examples, wherein determining the plurality of places associated with the road segment associated with the location comprises determining places with geographic coordinates along the road segment.

EXAMPLE 5

A method according to any of the previous examples, further comprising:
determining a direction of travel based on the received geographic coordinates for the location and at least one set of previously received geographic coordinates for a prior location.

EXAMPLE 6

A method according to any of the previous examples, further comprising:
determining a time of day for the received geographic coordinates for the location based on a time the geographic coordinates were received or based on a time of day included with the received geographic coordinates.

EXAMPLE 7

A method according to any of the previous examples, wherein selecting the best place from the plurality of places based on the visibility scores for each of the plurality of places comprises selecting the best place based on a highest visibility score indicating a highest visibility for the selected best place.

EXAMPLE 8

A method according to any of the previous examples, further comprising:
providing an indication of the best place to a computing device, wherein the best place is used in providing directions, providing a meeting location, or instead of a physical address.

EXAMPLE 9

A system comprising:
a memory that stores instructions; and
one or more processors configured by the instructions to perform operations comprising:
  receiving geographic coordinates for a location;
  determining a road segment associated with the location based on the geographic coordinates for the location;
  determining a plurality of places associated with the road segment associated with the location;
  extracting visual data for each of the plurality of places;
  generating a plurality of feature values based on the visual data for each of the plurality of places, the feature values comprising at least one of a size of text or a logo in the visual data, a height of visible text in the visual data, a distance from a road of the visible text, road segments from which the visible text in the visual data is visible, a directionality of visibility, and a readability of the visible text in the visual data;
  analyzing the plurality of feature values to generate a visibility score for each of the plurality of places; and
  selecting a best place from the plurality of places based on the visibility scores for each of the plurality of places.

EXAMPLE 10

A system according to any of the previous examples, wherein determining the road segment associated with the location is based on determining that the geographic coordinates for the location correspond to a predetermined range of geographic coordinates associated with the road segment.

EXAMPLE 11

A system according to any of the previous examples, wherein extracting the visual data comprises accessing one or more data stores to retrieve one or more images associated with each of the plurality of places.

EXAMPLE 12

A system according to any of the previous examples, wherein determining the plurality of places associated with the road segment associated with the location comprises determining places with geographic coordinates along the road segment.

EXAMPLE 13

A system according to any of the previous examples, the operations further comprising:
determining a direction of travel based on the received geographic coordinates for the location and at least one set of previously received geographic coordinates for a prior location.

EXAMPLE 14

A system according to any of the previous examples, the operations further comprising:
determining a time of day for the received geographic coordinates for the location based on a time the geographic coordinates were received or based on a time of day included with the received geographic coordinates.

EXAMPLE 15

A system according to any of the previous examples, wherein selecting the best place from the plurality of places based on the visibility scores for each of the plurality of places comprises selecting the best place based on a highest visibility score indicating a highest visibility for the selected best place.

EXAMPLE 16

A system according to any of the previous examples, the operations further comprising:
providing an indication of the best place to a computing device, wherein the best place is used in providing directions, providing a meeting location, or instead of a physical address.

EXAMPLE 17

A non-transitory machine-readable medium comprising instructions stored thereon that are executable by at least one processor to cause a computing device to perform operations comprising:
receiving geographic coordinates for a location;
determining a road segment associated with the location based on the geographic coordinates for the location;
determining a plurality of places associated with the road segment associated with the location;
extracting visual data for each of the plurality of places;
generating a plurality of feature values based on the visual data for each of the plurality of places, the feature values comprising at least one of a size of text or a logo in the visual data, a height of visible text in the visual data, a distance from a road of the visible text, road segments from which the visible text in the visual data is visible, a directionality of visibility, and a readability of the visible text in the visual data;
analyzing the plurality of feature values to generate a visibility score for each of the plurality of places; and
selecting a best place from the plurality of places based on the visibility scores for each of the plurality of places.

EXAMPLE 18

A non-transitory machine-readable medium according to any of the previous examples, wherein determining the road segment associated with the location is based on determining that the geographic coordinates for the location correspond to a predetermined range of geographic coordinates associated with the road segment.

EXAMPLE 19

A non-transitory machine-readable medium according to any of the previous examples, wherein extracting the visual data comprises accessing one or more data stores to retrieve one or more images associated with each of the plurality of places.

EXAMPLE 20

A non-transitory machine-readable medium according to any of the previous examples, wherein determining the plurality of places associated with the road segment associated with the location comprises determining places with geographic coordinates along the road segment.

Figure 9:
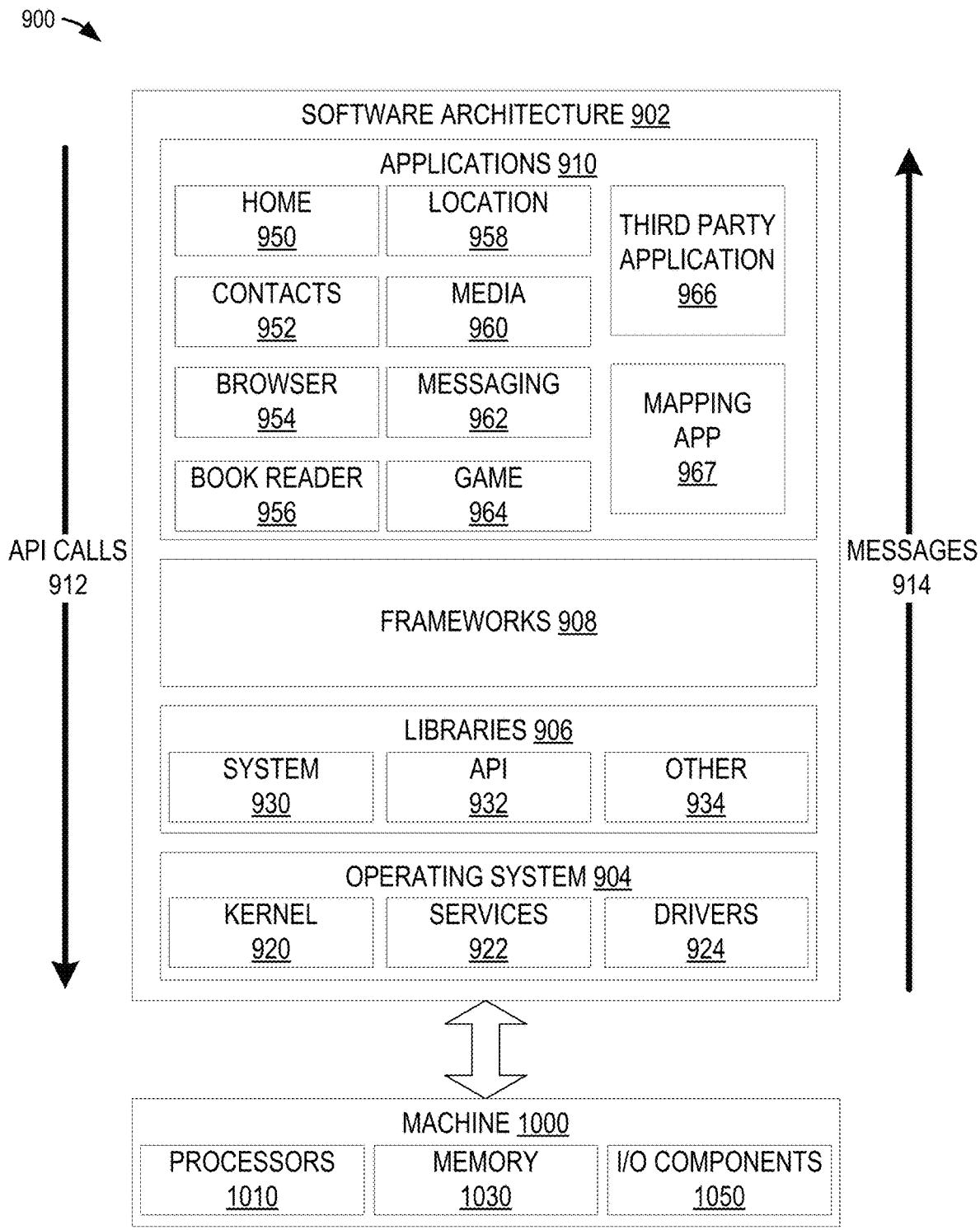
FIG. 9 is a block diagram illustrating an example of a software architecture that may be installed on a machine, according to some example embodiments.

FIG. 9 is a block diagram 900 illustrating a software architecture 902, which can be installed on any one or more of the devices described above. For example, in various embodiments, client devices 110 and servers and systems 130, 102, 120, 122, and 124 may be implemented using some or all of the elements of the software architecture 902. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Some embodiments may particularly include a mapping application 967. In certain embodiments, this may be a standalone application that operates to manage communications with a server system such as the third-party servers 130 or server system 102. In other embodiments, this functionality may be integrated with another application. The mapping application 967 may request and display various data related to mapping and navigation and may provide the capability for a user 106 to input data related to objects via a touch interface, via a keyboard, or using a camera device of the machine 1000, communication with a server system via the I/O components 1050, and receipt and storage of object data in the memory 1030. Presentation of information and user inputs associated with the information may be managed by the mapping application 967 using different frameworks 908, library 906 elements, or operating system 904 elements operating on the machine 1000.

Figure 10:
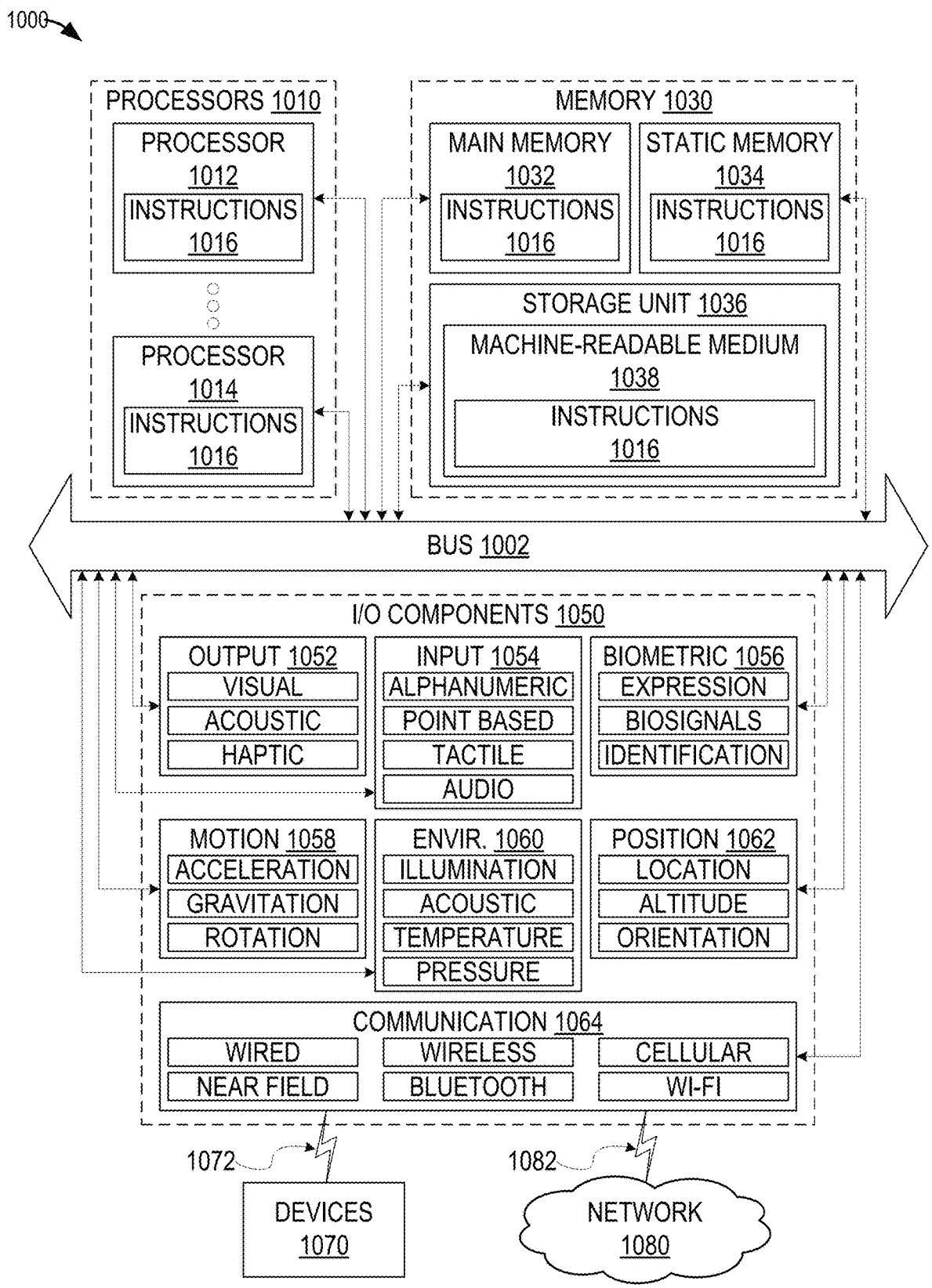
FIG. 10 illustrates a diagrammatic representation of a machine, in the form of a computer system, within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server or system 130, 102, 120, 122, 124, etc., or a client device 110 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1012, 1014 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the machine-readable medium 1038 should be considered as being transportable from one physical location to another. Additionally, since the machine-readable medium 1038 is tangible, the machine-readable medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
receiving, by a server system from a computing device, geographic coordinates for a location;
determining, by the server system, a road segment associated with the location based on the geographic coordinates for the location and based on a direction of movement of the computing device, the road segment comprising a side of a road corresponding to the geographic coordinates and the direction of movement of the computing device;
determining, by the server system, a plurality of places associated with the road segment associated with the location;
extracting, by the server system, visual data for each of the plurality of places based on a time of day that the geographic coordinates are received from the computing device by extracting visual data with a date or time that the visual data was captured that corresponds to the time of day that the geographic coordinates were received from the computing device;
generating, by the server system, a plurality of feature values based on the visual data for each of the plurality of places, the feature values comprising: a size of text or a logo in the visual data, a height of visible text in the visual data, a distance from a road of the visible text, road segments from which the visible text in the visual data is visible, a directionality of visibility, and a readability of the visible text in the visual data;

analyzing, by the server system, the plurality of feature values to generate a visibility score for each of the plurality of places, the visibility score indicating the extent to which each place is visible; and selecting, by the server system, a best place from the plurality of places based on the visibility scores for each of the plurality of places;

providing an indication of the best place to the computing device, wherein the best place is used in providing directions, providing a meeting location, or instead of a physical address.

2. The method of claim 1, wherein determining the road segment associated with the location is based on determining that the geographic coordinates for the location correspond to a predetermined range of geographic coordinates associated with the road segment.

3. The method of claim 1, wherein extracting the visual data comprises accessing one or more data stores to retrieve one or more images associated with each of the plurality of places.

4. The method of claim 1, wherein determining the plurality of places associated with the road segment associated with the location comprises determining places with geographic coordinates along the road segment.

5. The method of claim 1, further comprising:
determining a direction of travel based on the received geographic coordinates for the location and at least one set of previously received geographic coordinates for a prior location.

6. The method of claim 1, wherein selecting the best place from the plurality of places based on the visibility scores for each of the plurality of places comprises selecting the best place based on a highest visibility score indicating a highest visibility for the selected best place.

7. The method of claim 1, wherein the time of day that the geographic coordinates were received is during the day or during the night.

8. A system comprising:
a memory that stores instructions; and
one or more processors configured by the instructions to perform operations comprising:
receiving, from a computing device, geographic coordinates for a location;
determining a road segment associated with the location based on the geographic coordinates for the location and based on a direction of movement of the computing device, the road segment comprising a side of a road corresponding to the geographic coordinates and the direction of movement of the computing device;
determining a plurality of places associated with the road segment associated with the location;
extracting visual data for each of the plurality of places based on a time of day that the geographic coordinates are received from the computing device by extracting visual data with a date or time that the visual data was captured that corresponds to the time of day that the geographic coordinates were received from the computing device;
generating a plurality of feature values based on the visual data for each of the plurality of places, the feature values comprising: a size of text or a logo in the visual data, a height of visible text in the visual data, a distance from a road of the visible text, road segments from which the visible text in the visual data is visible, a directionality of visibility, and a readability of the visible text in the visual data;

analyzing the plurality of feature values to generate a visibility score for each of the plurality of places, the visibility score indicating the extent to which each place is visible; and selecting a best place from the plurality of places based on the visibility scores for each of the plurality of places;

providing an indication of the best place to the computing device, wherein the best place is used in providing directions, providing a meeting location, or instead of a physical address.

9. The system of claim 8, wherein determining the road segment associated with the location is based on determining that the geographic coordinates for the location correspond to a predetermined range of geographic coordinates associated with the road segment.

10. The system of claim 8, wherein extracting the visual data comprises accessing one or more data stores to retrieve one or more images associated with each of the plurality of places.

11. The system of claim 8, wherein determining the plurality of places associated with the road segment associated with the location comprises determining places with geographic coordinates along the road segment.

12. The system of claim 8, the operations further comprising:
determining a direction of travel based on the received geographic coordinates for the location and at least one set of previously received geographic coordinates for a prior location.

13. The system of claim 8, wherein selecting the best place from the plurality of places based on the visibility scores for each of the plurality of places comprises selecting the best place based on a highest visibility score indicating a highest visibility for the selected best place.

14. A non-transitory machine-readable medium comprising instructions stored thereon that are executable by at least one processor to cause a computing device to perform operations comprising:
receiving, from a computing device, geographic coordinates for a location;
determining a road segment associated with the location based on the geographic coordinates for the location and based on a direction of movement of the computing device, the road segment comprising a side of a road corresponding to the geographic coordinates and the direction of movement of the computing device;
determining a plurality of places associated with the road segment associated with the location;
extracting visual data for each of the plurality of places based on a time of day that the geographic coordinates are received from the computing device by extracting visual data with a date or time that the visual data was captured that corresponds to the time of day that the geographic coordinates were received from the computing device;
generating a plurality of feature values based on the visual data for each of the plurality of places, the feature values comprising: a size of text or a logo in the visual data, a height of visible text in the visual data, a distance from a road of the visible text, road segments from which the visible text in the visual data is visible, a directionality of visibility, and a readability of the visible text in the visual data;

analyzing the plurality of feature values to generate a visibility score for each of the plurality of places, the visibility score indicating the extent to which each place is visible; and selecting a best place from the plurality of places based on the visibility scores for each of the plurality of places;

providing an indication of the best place to the computing device, wherein the best place is used in providing directions, providing a meeting location, or instead of a physical address.

15. The non-transitory machine-readable medium of claim 14, wherein determining the road segment associated with the location is based on determining that the geographic coordinates for the location correspond to a predetermined range of geographic coordinates associated with the road segment.

16. The non-transitory machine-readable medium of claim 14, wherein extracting the visual data comprises accessing one or more data stores to retrieve one or more images associated with each of the plurality of places.

17. The non-transitory machine-readable medium of claim 14, wherein determining the plurality of places associated with the road segment associated with the location comprises determining places with geographic coordinates along the road segment.

\* \* \* \* \*